United States Patent [19]

Rueffer et al.

[11] Patent Number: 5,293,808
[45] Date of Patent: Mar. 15, 1994

[54] VACUUM BRAKE POWER BOOSTER

[75] Inventors: Manfred Rueffer, Sulzbach; Ralf Jakobi, Liederbach; Jurgen Bauer, Wiesbaden; Peter Kraft, Kassel-Wilhelmshohe, all of Fed. Rep. of Germany

[73] Assignee: Alfred Teves GmbH, Frankfurt am Main, Fed. Rep. of Germany

[21] Appl. No.: 859,486

[22] PCT Filed: Nov. 13, 1990

[86] PCT No.: PCT/EP90/01899

§ 371 Date: Jun. 12, 1992

§ 102(e) Date: Jun. 12, 1992

[87] PCT Pub. No.: WO91/08938

PCT Pub. Date: Jun. 27, 1991

[30] Foreign Application Priority Data

Dec. 16, 1989 [DE] Fed. Rep. of Germany ....... 3941604

[51] Int. Cl.$^5$ ............................................. F15B 9/10
[52] U.S. Cl. ................... 91/369.2; 91/376 R; 92/99; 92/101
[58] Field of Search .............. 91/369.1, 369.2, 376 R; 92/96, 98 R, 99, 101; 60/547.1

[56] References Cited

U.S. PATENT DOCUMENTS

| 4,487,105 | 12/1984 | Harrison | 91/376 R X |
| 4,611,526 | 9/1986 | Arino et al. | 91/369.2 |
| 4,892,027 | 1/1990 | Wagner et al. | 91/369.2 |
| 4,970,940 | 11/1990 | Boehm et al. | 91/369.2 |
| 5,136,927 | 8/1992 | Rossigno et al. | 91/369.2 |
| 5,146,837 | 9/1992 | Inoue | 91/369.2 |

FOREIGN PATENT DOCUMENTS

| 1560915 | 3/1969 | France . |
| 2149441 | 3/1973 | France . |
| 231863 | 10/1987 | Japan | 91/369.2 |
| 2219368 | 1/1988 | United Kingdom . |

*Primary Examiner*—Edward K. Look
*Assistant Examiner*—Hoang Nguyen
*Attorney, Agent, or Firm*—Robert P. Seitter; J. Gordon Lewis

[57] ABSTRACT

A vacuum brake power booster and a process is disclosed in which a precise adjustment of the power boost startup characteristic is achieved. The adjustment is carried out as a final step in the manufacture of the booster adjusting the distance between the valve piston and an elastic reaction distance. During adjustment, the vacuum brake power booster has a vacuum applied. A pre-established input force is exerted on the piston rod while simultaneously measuring the output force exerted by the push rod, and the axial length of the valve piston is modified until the measured output force is within a pre-established range. The adjustment is carried out by modifying the length of a two piece valve piston or by temporarily extending a rod within the valve piston until a correct output force is reached and thereafter removing the rod and inserting a transmission pin of a length determined by the extent of travel of the rod at the point at which the desired output force was attained.

24 Claims, 4 Drawing Sheets

VACUUM BRAKE POWER BOOSTER

The invention is related to a brake power booster with a booster housing which is divided into sealed vacuum power chambers by an axially movable wall subjected to a pneumatic pressure differential. A control valve positioned within a control housing, controls the pressure differential, and is actuatable by a valve piston. The valve piston is slidable by a piston rod which also acts on an output push rod by a connection comprised of a transmission ratio disc and an elastic reaction disc. A process must be employed during production for the precise adjustment of the axial distance between the transmission ratio disc and the reaction disc of the vacuum brake power booster.

It is necessary to adjust as exactly as possible the forementioned distance, the so-called "z" dimension, in order to reach the characteristic curves required.

In this context, the "z" dimension to be adjusted determines the behavior of the booster in the initial phase of its actuation, in particular, the level of the jumping rise of the output force during actuation with a pre-established input force (the so-called "jumper effect").

In the prior-art adjustment procedure, the booster housing of the ready-mounted vacuum brake power booster is evacuated, and the power chamber is vented simultaneously while measuring the output force. Venting takes place by sliding the valve piston under the effect of the pre-established input force of, for example, 300N. If and when the determined value of the output force falls within a pre-determined range, the adjustment procedure will be ended. If the above-mentioned force value falls outside the desired range, then both the push rod and the reaction disc with the transmission ratio disc being abutted against it must be removed in order to replace the transmission ratio disc with a new one which is correctly dimensioned. Upon reinstalling the reaction disc and the push rod, it is assumed that the desired "z" dimension has been reached, and the mounting operation can be finished.

The high costs of manufacture resulting from this complicated, time consuming adjustment procedure, is a significant disadvantage.

A further disadvantage arises in that all of the component parts (valve piston, reaction disc and transmission ratio disc) which are of importance for achieving the proper "z" dimension must meet very close tolerances.

Finally, there is a comparatively high reject rate caused by instances of incorrectly adjusted components.

It is, therefore, the object of the present invention to provide a vacuum brake power booster of the type described and a process for the adjustment of the "z" dimension which together with a considerable reduction of the mounting costs and of the reject rate results in a narrower range of output force levels.

SUMMARY OF THE INVENTION

According to the invention, this object is achieved in that the valve piston is provided with means which render possible a modification of its effective axial length from the point of engagement of the piston rod to the elastic reaction disc in the assembled brake power booster, the axial effective length of the valve piston adjusted to vary the "z" dimension to achieve the pre-determined force output.

The valve piston may be constituted by two parts, axially movable in respect of each other to a limited extent. This may be accomplished by an adjustment bushing which is abutted against the transmission ratio disc in the axial direction and is axially guided within the control housing to be rotationally fixed, and by a front part which interacts with the piston rod, the adjustment bushing and front part interconnected by a threaded connection.

According to the process, the effective length of the valve piston is modified by rotating the front part in respect to the adjustment bushing, the front part and adjustment bushing being fixed in their adjusted position as soon as the desired range of the output force is reached.

In another embodiment of the inventive brake power booster, it is envisaged that the valve piston is constituted by a front part which is axially guided in the control housing and by a power transmission pin which is sealedly guided within the front part, which is in abutment against the front part and interacts with the transmission disc, on one side, and with the piston rod, on the other side.

The process for the adjustment of a brake power booster presenting the forementioned set-up envisages that:

(a) one component of an input force which has been established previously is exerted on the front part, another component of the force is exerted on the transmission disc by a rod temporarily inserted through a bore in the valve piston;

(b) the required length of the force transmission pin is found out by adjusting the position of the rod and valve pin to measure the distance between an annular abutment surface of the front part and the advanced position of the rod upon reaching a pre-established output force range; and subsequently (c) a force transmission pin having an appropriate length is installed, the pin being sealed to prevent any fluid under pressure from bypassing the pin through the piston bore.

Further details and advantageous features of the invention will be revealed by the following description of two embodiments making reference to the accompanying drawing.

DETAILED DESCRIPTION

Figure 1:
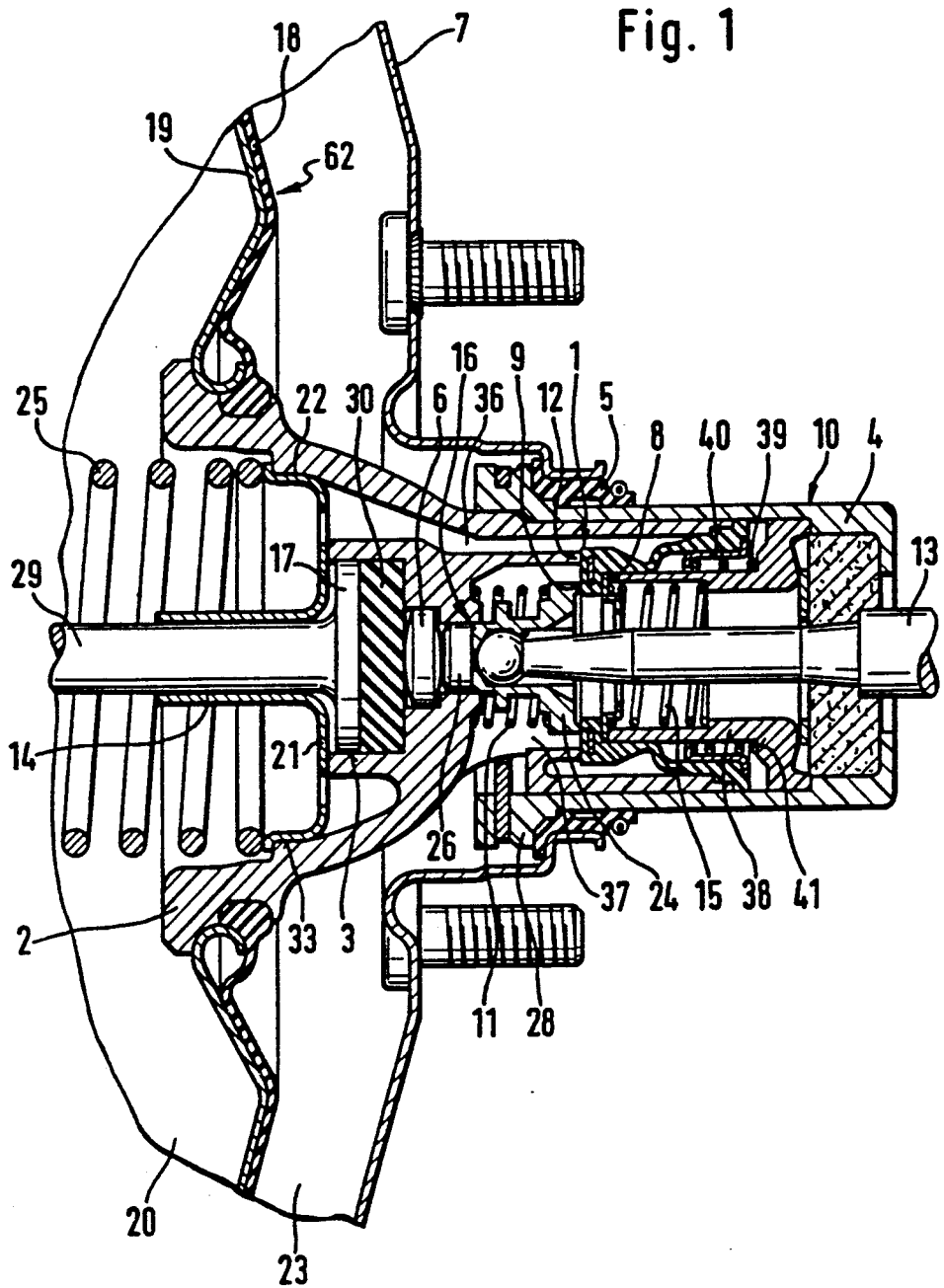
FIG. 1 shows a vacuum brake power booster according to the invention in partial axial section.

The housing of the vacuum brake power booster shown in FIG. 1 is comprised of two housing parts which are assembled to each other at a coupling point by providing indentations of which only a portion of the brake pedal-side housing part 7 is shown for better clarity. The inner space of the housing is subdivided by a movable wall 62 into a vacuum chamber 20 which is connected through a pneumatic connection to a vacuum source (not shown) and a power chamber 23.

The movable wall 62 is constructed of a metal diaphragm retainer 19 and of a rolling diaphragm 18 abutted against it in the power chamber 23 and is fixed to a first part 2 of a two part control housing 10. Control housing 10 includes a second part 4 which seals off the power chamber 23 from the atmosphere by a sliding guide ring 5.

In the inner space of the control housing 10, a control rod composed of the piston rod 13 and the valve piston 16 is axially slidingly positioned which is adapted to be coupled through a clevis to a brake pedal of an automotive vehicle. The control housing 10 moreover accommodates a valve arrangement 1, 9, 12 which is actuated by the valve piston 16 and which controls the pressure differential between the vacuum chamber 20 and the power chamber 23 through ducts 36, 37. The first control housing part 2 which is accommodated within the vacuum chamber 20 is formed with a stepped bore 3 within which a reaction disc 30 as well as a head flange 17 of a push rod 29 are positioned which actuates a master brake cylinder fixed to the front face of the booster housing (not shown).

In order to restore the movable wall 62, a restoring spring 25 is provided which is compressed between the first control housing part 2 and the bottom of the booster housing.

The control assembly of the vacuum brake power booster is illustrated in the stand-by position, that is to say, in a position in which the two chambers 20, 23 are separated from each other. Indeed, the two valve seats 9, 12 are abutted in this position against the sealing face of a poppet valve 1 which on its side facing away from the sealing face presents a limit stop 8 which comes to be abutted through a bushing 38 against the second control housing part 4. The second control housing part 4 is abutted with its collar 28 against the sliding ring 5, the sealing seat 9 at the valve piston 16 being urged by a piston rod return spring 11 against the sealing face of the poppet valve 1. The poppet valve 1 is simultaneously urged in the direction of the two sealing seats 9, 12 by means of a compression spring 15, its other end seated on the bushing 38. In addition, a second compression spring 39 is provided which is seated on a guide 40 of the poppet valve 1, on one side, and on an annular surface 41 of the bushing 38, on the other side, and keeps apart the two control housing parts 2, 4.

In order to achieve a precise guidance of the push rod 29, a guide bushing 14 is provided whose radial flange 21 takes support at an annular surface at the first control housing part 2 and passes over into a cylindrical guide surface 22 which interacts with a cylindrical section 33 of the first control housing part 2, so that the bending forces acting on the push rod 29 are effectively absorbed. The radial flange 21 which is furnished with a plurality of openings in the range of the mouth of the vacuum duct 36 is kept in position by the restoring spring 25 which is seated on a radial collar succeeding the cylindrical guide surface 22.

In this configuration, the reaction disc 30 comes to be accommodated within a section of the stepped bore 3 which faces the vacuum chamber 20. A second smaller diameter section of bore 3 has a transmission ratio disc 6 positioned therein which interacts with the valve piston 16 and whose surface is in contact with the reaction disc 30 to determine the transmission ratio of the brake apparatus. The distance "z" between the transmission ratio disc 6 and the reaction disc 30 constitutes a measure of vital importance for the functioning of the brake power booster whose significance will be explained in more detail below.

Figure 2:
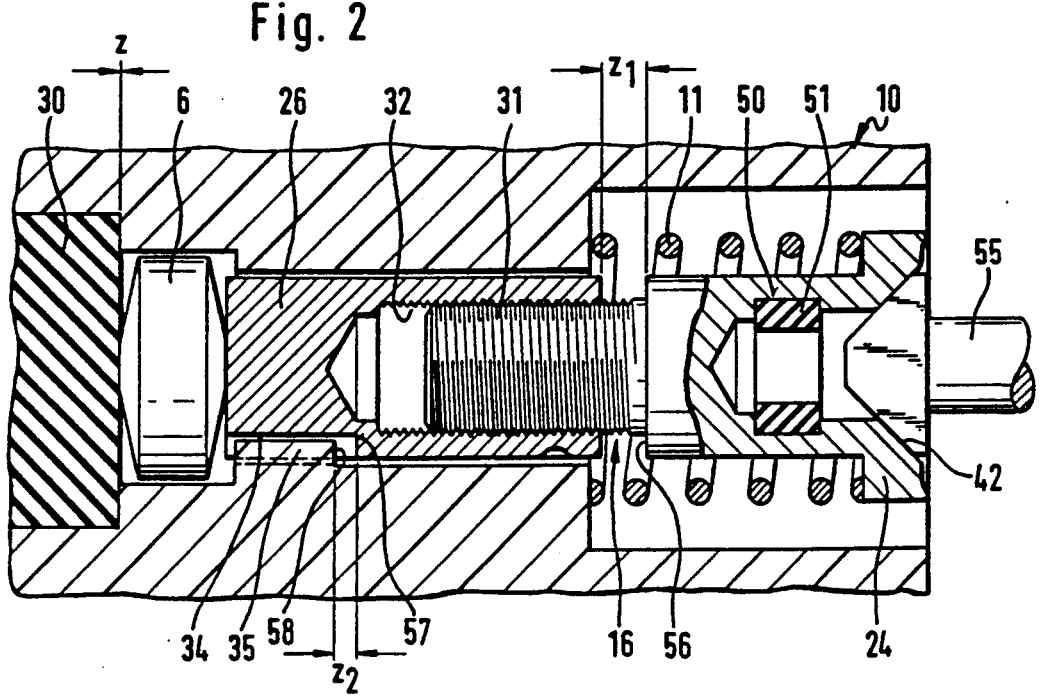
FIG. 2 is a fragmentary enlarged sectional view of the valve piston and adjacent components of the vacuum brake power booster shown in FIG. 1 during the adjustment.
Figure 3:
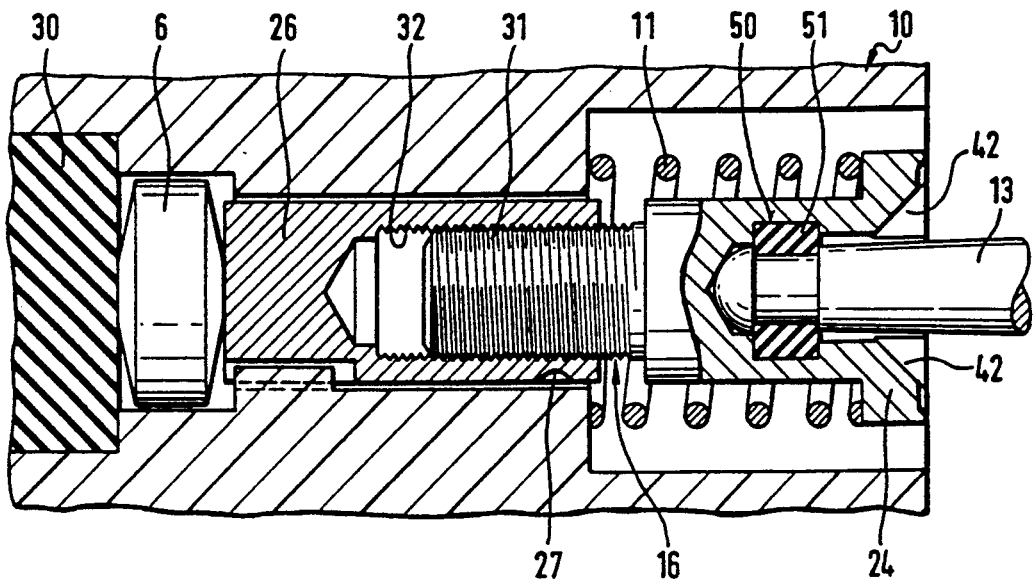
FIG. 3 is a fragmentary enlarged sectional view of the components shown in FIG. 2 after completion of the adjustment and installation of the piston rod.
Figure 4:
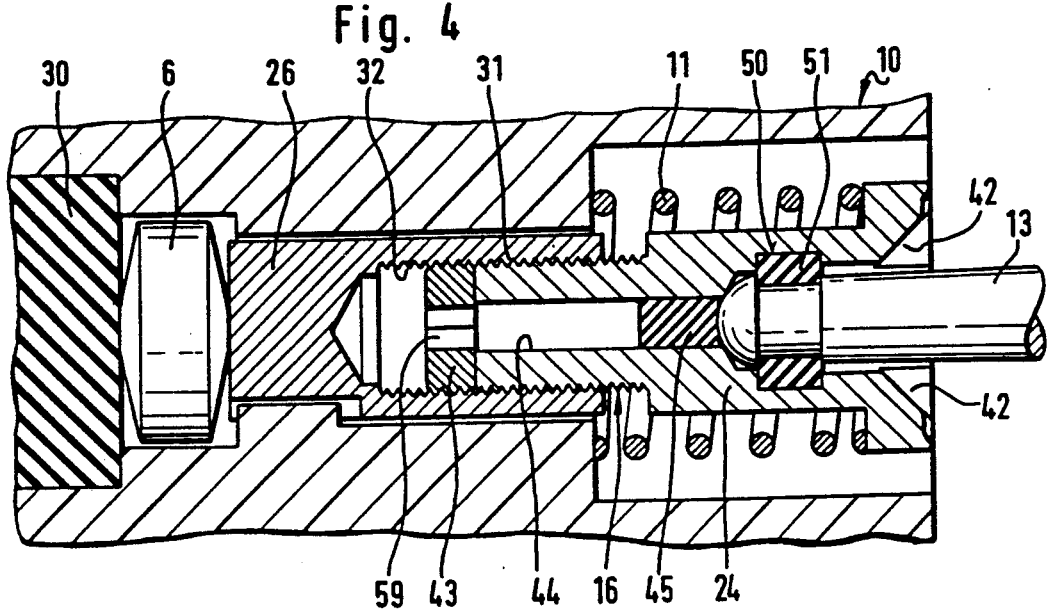
FIG. 4 is a fragmentary enlarged sectional view of another embodiment of the valve piston after adjustment and installation of the piston rod.

As will be appreciated from FIGS. 2 to 4, the valve piston 16 of the brake power booster according to the invention is of two-part construction. Preferably, the valve piston 16 is comprised of a front part 24 bearing against the sealing seat 9 and of an adjustment bushing 26, which is in abutment in an axial direction against the transmission ratio disc 6. The adjustment bushing 26 is axially guided while being fixed against rotation within the control housing 10. The fixing against rotation may, for example, be provided by a longitudinal groove 34 in the adjustment bushing 26 which interacts with a ridge 35 being moulded to the adjustment bushing 26. However, other arrangements can be employed, such as, for example, flats, square sections and the like.

In order to afford relative movement between the front part 24 and the adjustment bushing 26 in an axial direction for the purpose of setting the effective length of the valve piston 16 to adjust the aforementioned distance "z", a threaded connection is provided between the two parts which connection is formed by a male thread 31 on the front part 24 and by a mating female thread 32 in the adjustment bushing 26. To mount the piston rod 13 after adjustment, a radial groove 50 is provided in the front part 24 which accommodates an annular piston rod holder 51 which is preferably fabricated from elastic material.

During adjustment of the desired distance "z", in the illustrated example "z"=0, the booster housing of the inventive vacuum brake power booster is connected to a vacuum source (not shown) to duplicate the rest conditions of the vacuum brake power booster. Thereupon, an adjustment tool 55 is introduced into slots 42 provided for that purpose in the front part 24, which exerts a previously established input force, for example 300N, on the front part 24. As a result, the front part 24 will be shifted in the sense of venting of the power chamber 23, so that a corresponding boosting force is generated which adds to the input force which is applied to the front part 24, and is measured as output force at the push rod 29.

If it is found by the measurement that the value of the output force falls outside a previously established range, then an appropriate correction of the "z" dimension will be required, during which procedure the relative position of the adjustment bushing 26 and of the front part 24 is varied by rotating the front part 24 until a value of the output force is reached which is within the desired range. The "z" dimension corresponding to that value may by varied in one direction up to the value $z_1$ (distance between an annular surface 56 of the front part 24 and the end of the adjustment bushing 26 facing away from the transmission ratio disc 6), and in the other direction up to the value of $z_2$ (distance between a step 57 on the adjustment bushing 26 and a limit stop 58 on the control housing 10). When the desired "z" dimension is achieved, the adjustment tool 55 is retracted and the piston rod 13 is pressed into the front part 26 (FIG. 3). Alternatively, the adjustment bushing 26 may be formed or one-part with the transmission ratio disc 6.

Any unintentional rotation of the front part 24 and the adjustment bushing 36 are prevented by suitable provisions, such as, for example, shaping the mating threads 31, 32 to be irreversible, i.e., the threads 31, 32 of the front part 24 and the adjustment bushing 26 respectively have different pitches or flank angles. Or, the adjustment bushing 26 may be furnished with radial impressions 27 (FIG. 3), to act as a self-locking nut. Finally, the mating threads 31, 32 may be provided with microencapsulated adhesive or with a varnish locking coating.

In the design version of the inventive control assembly as per FIG. 4, the front part 24 is formed with an axial through bore 44. As a safeguard against loosening of the front part 24 and the adjustment bushing 26, a counter nut 43 is used which is screwed into the female thread 32 of the adjustment bushing 26. The counter nut 43 is furnished in the center with a wrench accommodating means 59, for example a square opening, and fixes the adjusted position of the front part 24 in respect of the adjustment bushing 26 by engaging the front end of the front part 24. In order to be able to tighten the counter nut 43, a wrench (not shown) is introduced through the bore 44 into the wrench accommodating means 59, and after removal at the end of the adjustment procedure, the bore 44 is hermetically closed by insertion of a sealing plug 45.

Figure 5:
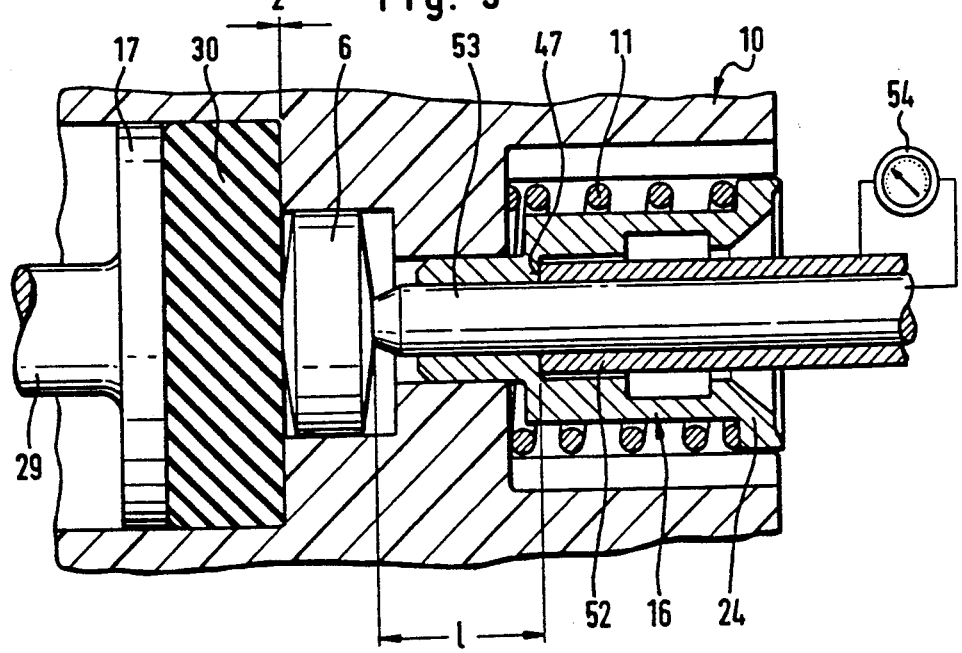
FIG. 5 is a fragmentary enlarged sectional view of another embodiment of the valve piston with a diagrammatic representation of a measuring device used during adjustment.
Figure 6:
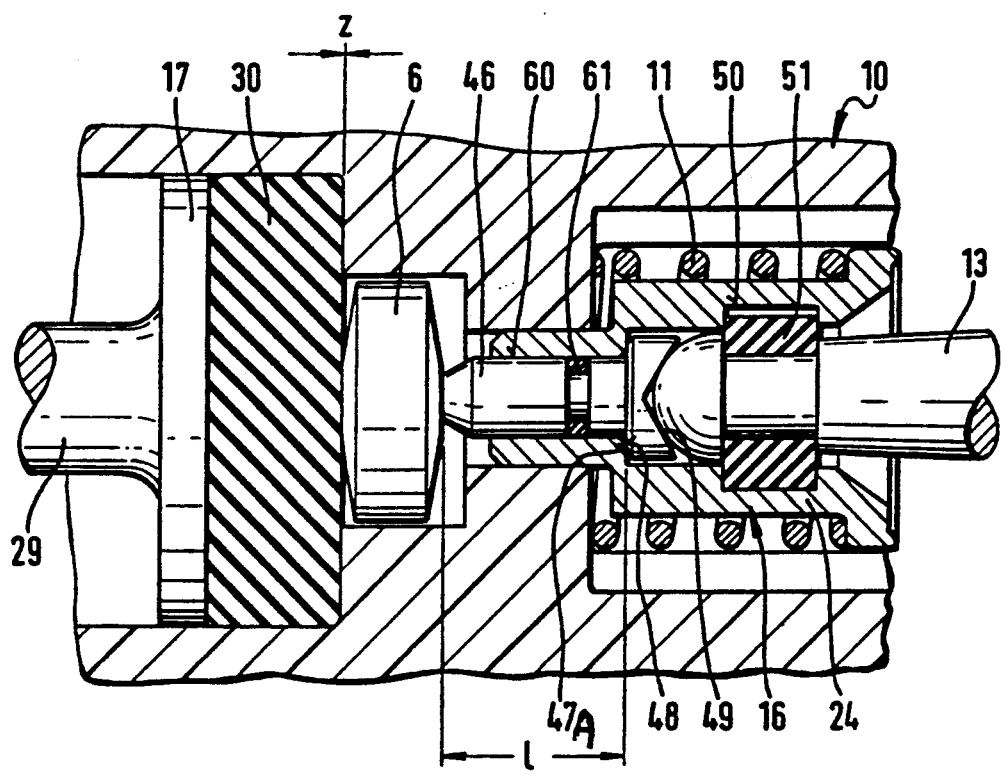
FIG. 6 is a fragmentary enlarged sectional view of the embodiment of the valve piston shown in FIG. 5 after the adjustment and installation of a transmission pin and piston rod.

Alternatively to the manner of setting the effective length of the valve piston 1 as described above, in the control assembly which is shown in FIGS. 5 and 6, the adjustment of the desired "z" dimension takes place by the insertion of power transmission pins 46 of an appropriate length "1" which is determined by means of a measuring device. The measuring device is comprised of a rod 53 temporarily inserted during the determination of the appropriate length "1" to engage the transmission ratio disc 6 during the determining of the desired length "1" and a bushing 52. The bushing 52 guides the rod 53 and engages the front part 24 at annular surface 47.

One component of the preselected input force is applied to the rod 53 upon the evacuation of the booster housing. At the same time, the other component of the force is exerted on the bushing 52, and transmitted to the front part 24 through contact with the annular surface 47, sliding the front part 24 in the sense of venting of the power chamber 23. The pre-determined force component exerted on the rod 53 is transmitted directly to the transmission ratio disc 6. As mentioned above, the measurement of the output force also takes place simultaneously. The position of the rod relative the front part 24 is adjusted until the output force is within the pre-determined range. The relative movement of the rod 53 over the bushing 52 from a starting point at the annular surface 47 in achieving the pre-determined output force is measured as by a dial gauge 54. This thus provides a measure of the distance between the annular surface 47 and the front part 24 and the abutment point of the rod 53 at the transmission ratio disc 6, at the correct adjusted position.

The dimension "1" determined in this way forms the required length "1" of a power transmission pin 46 which is inserted into an axial bore 60 of the front part 24. Sealing is accomplished by means of an O-ring 61 and accurate location of the pin 46 by an abutment or in the axial direction when assembled of a step 48 against the annular surface 47 of the pin 46.

After the assembly of the power transmission pin 46, the piston rod 13 with the piston rod holder 51 is mounted, the hemispherical end of the piston rod 13 being accommodated in a recess 49 of the power transmission pin 46 having a V-shaped cross section.

Instead of the power transmission pins 46 of different length "1", two-part pins may be utilized which are adjusted to the previously determined length prior to installation. In order to fix the two parts together in the adjusted position, a thread with mortisings or a spot weld may, for example, be used to prevent any change in the adjusted pin length.

We claim:

1. A vacuum brake power booster for increasing the force between an input piston rod and a power output push rod, said power booster including a booster housing which is sealingly divided into a vacuum chamber and a power chamber by an axially movable wall being adapted to be subjected to a pneumatic pressure differential, a control housing, a control valve including means which controls the pressure differential positioned within said control housing, said control valve actuatable by a valve piston, said valve piston slidable by means of engagement with said piston rod, transmission means causing said valve piston to have a force-transmitting connection with said push rod, said transmission means including a transmission ratio disc and an elastic reaction element, and wherein said valve piston includes means which in the assembled condition of the brake power booster enable a modification of the effective axial length thereof from said point of engagement with said piston rod to the point of engagement with said reaction disc;

said valve piston is constituted by an adjustment bushing abutted against said transmission ratio disc in an axial direction and by a front part engaged with said piston rod, said adjustment bushing and front part interconnected by mating threads; said adjustment bushing fixed against rotation and axially guided in said control housing.

2. A vacuum brake power booster as claimed in claim 1, wherein said adjustment bushing is formed with an axially extending groove which accommodates an axially extending ridge formed on said control housing whereby said adjustment bushing is rotationally fixed in said control housing.

3. A vacuum brake power booster as claimed in claim 1, further including means preventing loosening of said mating threads.

4. A vacuum brake power booster as claimed in claim 3, wherein said mating threads are configured as an irreversible thread.

5. A vacuum brake power booster as claimed in claim 3, wherein said means preventing loosening of said mating threads comprises radial impressions in said control housing.

6. A vacuum brake power booster as claimed in claim 3, wherein said means preventing loosening of said mating threads comprises a counter nut which is threaded on said front part.

7. A vacuum brake power booster as claimed in claim 6, wherein said front part is formed with an axial through bore and a sealing plug seals said bore.

8. A vacuum brake power booster as claimed in claim 1, wherein at an end facing said piston rod, said front part of the said valve piston is furnished with slots which serve to accommodate an adjustment tool used for turning thereof.

9. A vacuum brake power booster for increasing the force between an input piston rod and an output push rod, said power booster including a booster housing which is sealingly divided into a vacuum chamber and a power chamber by an axially movable wall being adapted to be subjected to a pneumatic pressure differential, a control housing, a control valve including means which controls the pressure differential positioned within said control housing, said control valve actuable by a valve piston, said valve piston slidable by means of engagement with said piston rod, transmission means causing said valve piston to have a force-transmitting connection with said push rod, said transmission means including a transmission ratio disc and an elastic reaction element, wherein said valve piston includes a front part axially guided within the said control housing and a power transmission pin slidably guided within a bore in said front part and which transmission pin has a radial step in abutment against said front part in an axial direction, said transmission pin drivingly engaged with said reaction element on one end, and with said piston rod the other end.

10. A vacuum brake power booster as claimed in claim 9, wherein said transmission pin radial step is in abutment against an annular surface on said front part, said transmission pin other end facing said piston rod with an axial recess formed therein having a V-shaped cross section.

11. A vacuum brake power booster as claimed in claim 9 wherein said power transmission pin is sealed to said bore in said front part.

12. A vacuum brake power booster as claimed in claim 10, wherein said front part is formed with a radial groove having an elastic ring-shaped piston rod holder installed therein.

13. A process for assembling a vacuum brake power booster having an elastic reaction disc interposed between a booster power controlling valve piston and an output push rod, said valve piston advanced by an input piston rod to control the power boost, and a transmission disc interposed between the relative valve piston and the reaction disc, a process a vacuum chamber adapted to be subjected to vacuum and a power chamber vented by an input force acting on said valve piston to generate an output force on said push rod, said process comprising the steps of applying a predetermined input force on said valve piston while simultaneously measuring the output forces, and adjusting the effective axial length of said valve piston from said push rod to said reaction disc to cause said output force to fall into predetermined output force range.

14. The process as claimed in claim 13, wherein said adjusting of the effective axial length of the said valve piston is carried out by relatively moving respective parts, by rotating a front part in respect of an adjustment bushing component of said valve piston, and further including the step of fixing said front part and said adjustment bushing in their adjusted position as soon as said output force falls into said pre-determined range.

15. The process as claimed in claim 13, wherein said valve piston effective length is adjusted prior to assembly of said piston rod.

16. A process as claimed in claim 13 wherein said adjusting step is carried out by temporarily inserting a rod through a bore in said valve piston and into engagement with said transmission disc, said rod advanced relative said valve piston to adjust the effective length of said valve piston.

17. The process as claimed in claim 16 wherein a component of said input force is exerted on valve piston by a temporarily installed bushing engaging an annular abutment face on said valve piston and the distance is measured from said abutment face to the end of said rod when said measured output force falls into said predetermined range and constructing a transmission pin having a flange adapted to engage said abutment face and a reduced diameter portion inserted in said valve piston after removal of said bushing rod, said transmission pin of a length to project forward of said valve piston the same distance as said rod when said output force is achieved.

18. The process as claimed in claim 17 further including the step of sealing said transmission pin to said bore in said valve piston.

19. A process for adjusting a characteristic of a brake power booster of the type including an input piston rod, an output push rod, a housing having a vacuum chamber and a power chamber formed by an axially movable wall subjected to a pressure differential acting thereacross to generate a boosting force acting on said output push rod, a control valve controlling the magnitude of said pressure differential including a valve piston movable by engagement of one end thereof with said input piston rod, an elastic reaction element interposed between said valve piston and said output push rod and a transmission element positioned at the other end of said valve piston and having a surface engaging said elastic reaction element, the process comprising the steps of
applying a predetermined input force to said valve piston while measuring the output force generated by said output push rod;
positioning said transmission element surface relative said reaction element at a point whereat said output force falls into a predetermined range; and
fixing the distance of the other end of said valve piston from the point of engagement with said piston rod to correspond to said position of said transmission element surface at said point whereat said output force falls into said range.

20. The process according to claim 19 wherein said positioning step includes the step of relatively moving separate parts of said valve to change said distance of said other end of said valve piston from the said point of engagement with said piston rod.

21. The process according to claim 20 wherein said adjusting step includes the step of urging said transmission element surface towards said reaction element by a temporarily installed test rod extending through a bore in said valve piston and projecting forwardly to engage said transmission element, said urging accomplished by one component of the said input force and adjusting the position of said rod relative said valve piston until said output force is achieved.

22. The process according to claim 21 further including the step of exerting the other component of the input force on an abutment surface of said valve piston and thereafter installing a transmission pin having a flange engaging said abutment surface and having a portion extending through said valve piston opening and projecting forwardly the same distance as said rod when said output force is achieved.

23. The process according to claim 22 wherein said input piston rod is installed to engage said transmission pin.

24. The process according to claim 23 further including the step of sealing said transmission pin to said bore in said valve piston.

* * * * *